United States Patent [19]

Wanger

[11] 4,142,364
[45] Mar. 6, 1979

[54] BACK-UP CONTROL FOR GAS TURBINE ENGINE

[75] Inventor: Robert P. Wanger, Fairfield, Ohio

[73] Assignee: General Electric Company, Cincinnati, Ohio

[21] Appl. No.: 818,257

[22] Filed: Jul. 22, 1977

[51] Int. Cl.² ............................................. F02C 9/08
[52] U.S. Cl. ............................................. 60/39.28 R
[58] Field of Search ................................. 60/39.28 R

[56] References Cited

U.S. PATENT DOCUMENTS

| 3,371,481 | 3/1968 | Warne | 60/39.28 R |
|---|---|---|---|
| 3,393,691 | 7/1968 | Longstreet et al. | 60/39.28 R |
| 3,426,777 | 2/1969 | Plummer | 60/39.28 R |
| 3,936,226 | 2/1976 | Harner et al. | 60/39.28 R |

*Primary Examiner*—Robert E. Garrett

*Attorney, Agent, or Firm*—Henry J. Policinski; Leslie L. Kasten, Jr.; Derek P. Lawrence

[57] ABSTRACT

An improved back-up control for use in an aircraft gas turbine engine is presented and includes a fuel control valve adapted to meter the flow of fluid to the gas turbine engine, first means for providing a mechanical position signal indicative of the magnitude of a desired fuel flow change to the engine and second means for limiting the rate at which a change in the signal is transmitted to the fuel control valve thereby limiting the rate of change in fuel flow to the engine. The second means may limit the transmission rate in response to inlet pressure. A variable geometry control valve is provided for varying the position of the variable elements of the gas turbine engine in response to said mechanical position signal and the second means limits the rate at which a change in the signal is received by the variable geometry control valve.

8 Claims, 2 Drawing Figures

BACK-UP CONTROL FOR GAS TURBINE ENGINE

BACKGROUND OF THE INVENTION

This invention relates to a control system for an aircraft gas turbine engine and, more particularly, to a control system including a back-up control adapted to provide continued operation of an aircraft gas turbine engine in the event of malfunction or failure of the primary engine control system.

Full authority electronic control systems for gas turbine engines provide a number of significant advantages over conventional hydromechanical control systems. However, since full authority electronic control systems are only advancing to what might be termed a first-generation level, confidence in the reliability of such electronic controls has not attained the level generally associated with the hydromechanical systems in use for many years in highly refined configurations. Consequently, it is advisable to complement the electronic control system with a secondary or back-up hydromechanical control system which will ensure continued operation of the engine in the event the primary electrical control system exhibits a malfunction or a failure.

Many hydromechanical back-up control systems known in the prior art, such as that shown in U.S. Pat. No. 3,820,323, rely upon the pilot of the aircraft to assure that the gas turbine engines do not encounter engine stall or overtemperature during changes in the speed of the engine. In such a system the pilot has the responsibility of accelerating or decelerating the engine within certain rate limits in order to avoid the aforementioned engine stall and overtemperature. Specifically, the pilot, while increasing engine thrust or speed, must be cognizant of possible engine stall or overtemperature and must direct his attention at advancing the power lever at a rate sufficiently slow enough to avoid these adverse effects. Since permissible rates of increase in engine speed or thrust vary with specific flight conditions, the pilot is required to be further aware of which specific rate is applicable to his present flight condition. Hence, significant pilot attention is required to accomplish a change in engine speed or thrust and consequently the pilot is not fee to attend to other equally important tasks required in the operation of the aircraft.

SUMMARY OF THE INVENTION

Therefore, it is an object of the present invention to provide an integrated control system for a gas turbine engine wherein the primary control of the engine is accomplished by an electronic control system and wherein the control of the engine, upon failure or malfunction of the electronic system, is accomplished by a back-up hydromechanical control system.

It is yet another object of the present invention to provide a back-up hydromechanical control system wherein acceleration and deceleration of the engine is regulated by the back-up control system itself whereby the pilot may be free to concentrate on other tasks associated with operation of the aircraft.

Briefly stated, these and other objectives, as well as advantages which will become apparent hereinafter, are accomplished by the present invention which, in one form, provides an improvement in a back-up control system associated with an integrated control system for an aircraft gas turbine engine having an engine inlet, wherein the improvement comprises a fuel control valve adapted to meter the flow of fuel to the engine and first means for providing a mechanical position signal indicative of a desired fuel flow to the engine. The fuel control valve is adapted to meter fuel to the engine in response to the mechanical position signal. Second means are provided for selectively limiting the rate at which a change in the mechanical position signal is transmitted to the fuel control valve thereby limiting the rate of change of fuel flow to the engine. The second means may limit the transmission rate in response to an ambient condition, such as engine inlet pressure. The improvement may also include a variable geometry control valve adapted to control the position of at least one variable element of the gas turbine engine in response to the mechanical position signal and the second means may selectively limit the rate at which a change in the mechanical position signal is transmitted to the variable geometry control valve. The first means may be comprised of a hydromechanical amplifier in fluid communication via a first fluid conduit with a source of fluid under pressure and via a second fluid conduit with a fluid sump and the limiting means may be comprised of variable restrictor means disposed within the second fluid conduit for limiting the flow rate of fluid through the second conduit.

DESCRIPTION OF THE DRAWINGS

While the specification concludes with claims distinctly claiming and particularly pointing out the invention described herein, the invention is more readily understood by reference to the discussion below and the accompanying drawings in which:

DESCRIPTION OF THE PREFERRED EMBODIMENT

Figure 1:
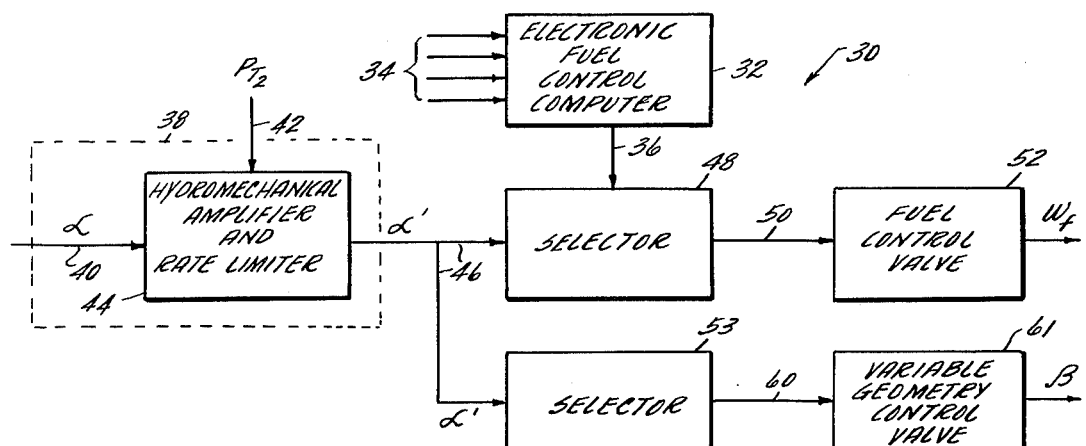
FIG. 1 is a schematic block diagram of a control system for a gas turbine engine including a back-up control incorporating a hydromechanical amplifier and rate limiter of the present invention.

Referring to FIG. 1, a block diagram representation of the control system including the present invention is presented and depicted generally at 30. Control system 30 includes primary electronic fuel control computer 32 receiving a number of input signals 34, each representative of a selected engine operating parameter. Typical parameters may include fan inlet pressure, fan inlet temperature, fan speed, core engine speed, compressor discharge temperature, turbine inlet temperature and power level angle, each of which may be utilized by computer 32 in providing an electronic output signal 36 useable in scheduling fuel to the gas turbine engine in a primary mode. A complete description of computer 32 is not deemed to be essential for an understanding of the present invention and, hence, is not further presented.

Control system 30 includes back-up mechanical control 38 useable in scheduling engine fuel flow and the position of variable elements of the engine in response to the throttle position set by the pilot to achieve a certain level of thrust or speed and in response to pressure signal 42 ($P_{T_2}$) indicative of the magnitude of total pressure existing at the inlet of the gas turbine engine. Mechanical position signal 40 or $\alpha$, indicative of the desired percent of maximum possible thrust, is generated by appropriate linkage in accordance with the power lever setting selected by the pilot.

Signals 40 and 42 are received by amplifier and rate limiter 44 which amplifies signal 40 and further limits, in response to pressure signal 42, the rate at which a change in position signal 40 is transmitted to fuel control valve 52. Rate limiter 44 is provided since the acceleration capability of the engine is limited and hence the rate of change in fuel flow to the engine must be less than certain limits to avoid engine stall or over-temperature. Therefore, in the event the pilot modifies the throttle position in the aircraft, thereby changing the magnitude of position signal 40, element 44 limits the rate at which the change in amplified signal 40 is passed, as signal 46 ($\alpha'$), to the fuel control valve 52 of the engine. As will further be elaborated, at low altitudes rate limiter 44 permits more rapid transmission of changes in signal 40 than at higher altitudes where permissible maximum acceleration limits are lower. This feature of the invention will be more fully explained with reference to FIG. 2.

Selector 48 receives electrical output signal 36 and mechanical output signal 46 and provides a fuel metering signal 50 to fuel control valve 52 which, in turn, schedules fuel to the gas turbine engine at a rate $W_f$. Generally, selector 48 is adapted to provide metering signal 50 in response to computer output signal 36 when primary electronic fuel control computer 32 is functioning properly. In the event of a malfunction or nonfunction of computer 32 or other elements associated with it, selector 48 is adapted to provide a metering signal 50 which essentially corresponds to mechanical output signal 46 received from back-up control 38.

A second selector 53 also receives mechanical output signal 46. Additionally, selector 53 receives variable geometry control signal 54 provided by electronic variable geometry control computer 56. Computer 56 receives a number of input signals 58 each representative of a selected engine operating parameter and useful in setting the position of variable structural elements in the gas turbine engine, such as variable stators in the compressor section of the engine or variable nozzles associated with the exhaust portion of the gas turbine engine. Selector 53 is adapted to operate in a manner similar to the operation of selector 48. When computer 56 is functioning properly, selector 53 provides a variable geometry position signal 60 to variable geometry control valve 61 in response to control signal 54 provided by computer 56. In the event of a malfunction or nonfunction of computer 56 or engine components, such as engine sensors, associated with it, selector 53 is adapted to provide a position signal 60 which essentially corresponds to mechanical signal 46 associated with back-up control 38. Control valve 61 schedules the variable elements of the gas turbine engine at the appropriate position $\beta$.

Figure 2:
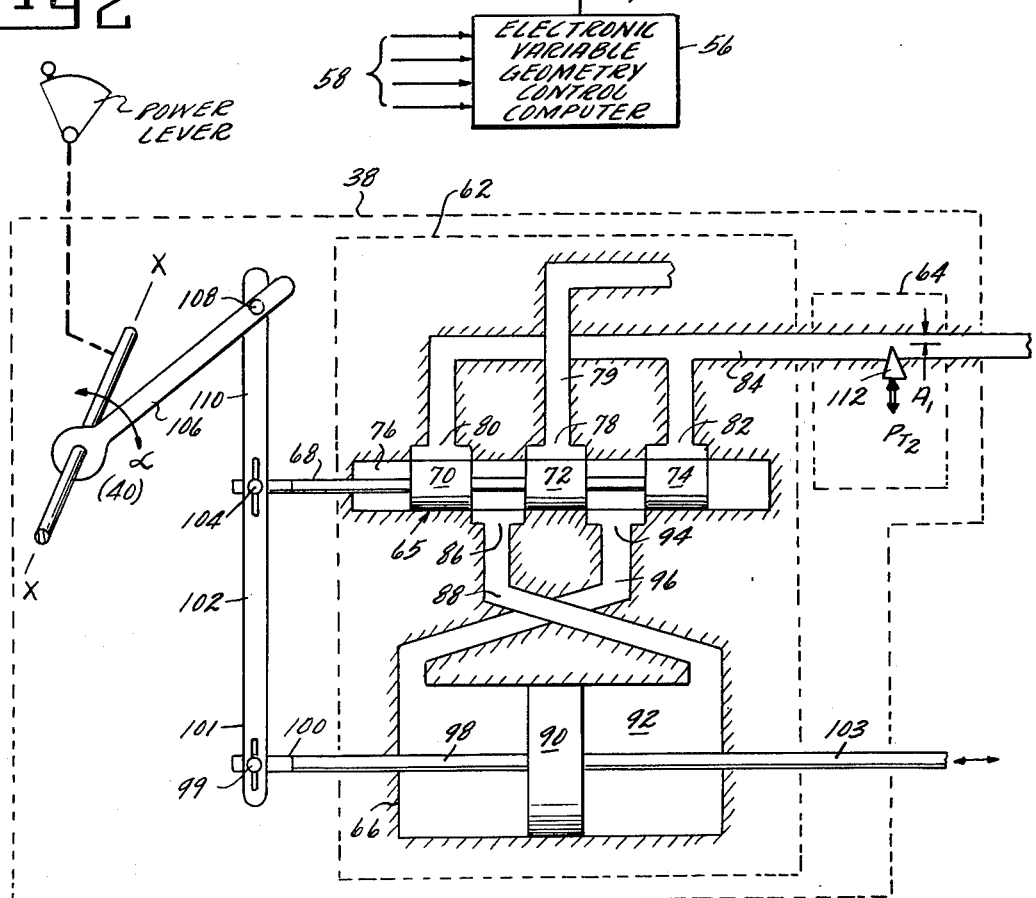
FIG. 2 is a more detailed schematic representation of the hydromechanical amplifier and rate limiter depicted in FIG. 1.

Referring now to FIG. 2, a schematic representation of back-up control 38 is presented in greater detail than that depicted in FIG. 1. Back-up control 38 generally includes hydromechanical amplifier 62 and rate limiter 64. Amplifier 62 is shown to be comprised of a conventional design wherein a spool-valve type servo unit 65 is in fluid communication with a power piston unit 66. More specifically, servo unit 65 is comprised of an elongated rod 68 having a plurality of increased diameter spaced apart lands 70, 72 and 74 disposed generally at one end thereof. Lands 70, 72, 74 reside in a fluid chamber 76 having a fluid inlet port 78, connected to a source of hydraulic fluid under pressure through fluid supply conduit 79, and a pair of outlet ports 80 and 82 in fluid communication with a sump (not shown) through sump conduit 84. Additionally, port 86 provides fluid communication via conduit 88 between fluid chamber 76 and one side of power piston 90 disposed translatably within a fluid chamber 92 in power piston unit 66. Port 94 provides fluid communication via conduit 96 between fluid chamber 76 and a second side of power piston 90. Power piston 90 is fixedly secured to an elongated shaft 98 extending through unit 66. One end 100 of shaft 98 is pivotally secured at pivot 99 to one end 101 of power input lever linkage member 102. The other end 103 of shaft 98 is adapted to provide mechanical position signal 46 to selectors 48 and 53. Linkage member 102 is further pivotally secured at intermediate pivot 104 to elongated rod 68 of servo unit 65 and to a power level input link 106 at pivot 108 disposed at end 110 of linkage member 102. Input link 106 is adapted to rotate about an axis X—X in response to change in the engine operator's power lever control and the angular position $\alpha$ of link 106 establishes signal 40.

Proceeding with a description of the operation of amplifier 62, as viewed in FIG. 2 amplifier 62 is depicted in its steady state position; that is to say, in the position occupied when the engine is operating in a steady state position. In the steady state position lands 70, 72 and 74 overlap and block ports 80,78 and 82 respectively. Hence, chamber 92 is isolated from fluid communication with fluid supply conduit 79 and sump conduit 84. In the event the pilot of the aircraft desires to change the thrust output of the gas turbine engine, he moves the position of the power lever in the aircraft which in turn changes the angular position of link 106, thus requiring a change in fuel flow to the engine. By way of example, if increased thrust or fuel flow were desired, link 106 would rotate clockwise as viewed in FIG. 2. Since outlet ports 80 and 82 are blocked in the steady state position, piston 90 is hydraulically locked in place and linkage member 102 is caused to rotate about pivot 99. Rotation of member 102 in the clockwise direction pushes elongated rod 68 to the right as viewed in FIG. 2 thus establishing fluid communication between ports 78 and 86 whereby pressurized fluid is delivered to the right side of power piston 90. Simultaneously, communication is established between outlet port 82 and port 94 whereby fluid to the left of piston 90 may be returned to sump. Hence, fluid under pressure on the right side of piston 90 moves piston 90 to the left, displacing fluid to the left of piston 90 to sump, and modifying fuel flow to the engine and the position of the variable elements in the engine. Movement of piston 90 pivots linkage member 102 clockwise about pivot point 108 and such movement translates elongated rod 68 leftward until once again lands 72 and 74 block ports 78 and 82 respectively whereupon the system is again in a steady state condition but with the gas turbine engine operating at an increased thrust output. The degree of change in the angular position of link 106 determines the magnitude of travel of piston 90 and hence the magnitude of thrust increase. Additionally, a decrease in engine thrust may be accomplished by rotating link 106 counterclockwise whereupon rod 68 translates to the left causing piston 90 to translate to the right.

As earlier stated it is one of the objects of the present invention to provide a hydromechanical back-up control system wherein the pilot is relieved of monitoring the rate at which changes in fuel flow are effected during engine operation. Hence, the back-up control 38 of the present invention provides means for limiting the rate of change of fuel flow to the engine and correspondingly the acceleration of the engine in response to ambient conditions, particularly as represented in the total pressure existing at the inlet of the gas turbine engine. More specifically, the present invention provides second means or rate limiter 64 which limits the rate of change of fuel flow to the gas turbine engine in response to the engine inlet total pressure ($P_{T_2}$). Limiting the rate of change of fuel flow is accomplished by limiting the rate at which a change in power level angle is received by fuel control valve 52 or in other words the rate at which a signal indicative of the magnitude of a desired change in fuel flow is received by valve 52. As depicted in FIG. 2, a variable restrictor 112 is disposed in sump conduit 84 for the purpose of selectively restricting the flow of servo unit hydraulic fluid from the low pressure side of piston 90 under transient operation. Consequently, when the angular position of link 106 is modified, thereby signaling a desired change in the magnitude of fuel flow to the gas turbine engine, rate limiter 64 limits the rate at which servo unit hydraulic fluid drains from the low pressure side of piston 90. This, in turn, limits the rate at which piston 90 translates in chamber 92 and hence limits the rate at which the change in magnitude of fuel flow is accomplished. Variable restrictor (112) modifies variable flow area $A_1$ proportionally with respect to engine inlet total pressure $P_{T_2}$. When $P_{T_2}$ is high, as encountered at sea level conditions, $A_1$ is large and hence the rate of translation of piston 90 within chamber 92 is relatively fast. When $P_{T_2}$ is low, as encountered at high altitude, $A_1$ is small. Under this latter condition, the flow of fluid from the low pressure side of piston 90 is restricted and hence piston 90 translates at a slower rate which results in a reduced rate of change of fuel flow to the gas turbine engine.

While the preferred embodiment of the present invention has been dipicted and described, with respect to an aircraft gas turbine engine, it will be appreciated by those skilled in the art that the invention is equally applicable to other gas turbine engines such as those used in marine, industrial and automotive applications and it should further be appreciated that modifications may be made to the embodiment without departing from the scope of the invention as set forth in the appended claims.

I claim:

1. In a back-up control associated with a control system for a gas turbine engine having an engine inlet, the improvement comprising:
   a fuel control valve for metering the flow of fuel to said engine;
   first means for providing a mechanical position signal indicative of the magnitude of a desired fuel flow to said engine, said fuel control valve metering the flow of fuel to said engine in response to said signal; and
   second means for limiting the rate at which a change in said signal is transmitted to said valve said second means operating to limit said transmission rate in response to engine inlet pressure.

2. In a back-up control associated with a control system for a gas turbine engine having an engine inlet, the improvement comprising:
   a fuel control valve for metering the flow to fuel to said engine;
   first means for providing a mechanical position signal indicative of the magnitude of a desired fuel flow to said engine, said fuel control valve metering the flow of fuel to said engine in response to said signal;
   a hydromechanical amplifier adapted to amplify said signal, said fuel control valve receiving said amplified signal; and
   second means for limiting the rate at which a change in said signal is transmitted to said valve thereby limiting the rate of change of fuel flow to said engine.

3. The invention as set forth in claim 2 wherein said second means limits said transmission rate in response to engine inlet pressure.

4. In a back-up control associated with a control system for a gas turbine engine having an engine inlet, the improvement comprising:
   a fuel control valve for metering the flow of fuel to said engine;
   first means for providing a mechanical position signal indicative of the magnitude of a desired fuel flow to said engine and further indicative of a desired position of at least one variable element of said gas turbine enging, said fuel control valve metering the flow of fuel to said engine in response to said signal; and
   second means for limiting the rate at which a change in said signal is transmitted to said valve thereby limiting the rate of change of fuel flow to said engine.

5. The invention as set forth in claim 4 further comprising:
   a variable geometry control valve adapted to control the position of said one variable element in said gas turbine engine in response to said mechanical position signal, said variable geometry control receiving said mechanical position signal, said second means limiting the rate at which a change in said signal is transmitted to said variable geometry control valve.

6. The invention as set forth in claim 5 wherein said second means limits said transmission rate of said signal in response to engine inlet pressure.

7. In a back-up control associated with a control system for a gas turbine engine having an engine inlet, the improvement comprising:
   a fuel control valve for metering the flow of fuel to said engine;
   first means for providing a mechanical position signal indicative of the magnitude of a desired fuel flow to said engine, said fuel control valve metering the flow of fuel to said engine in response to said signal;
   a hydromechanical amplifier in fluid communication via a first conduit with a source of fluid under pressure and via a second fluid conduit with a fluid sump; and
   second means for limiting the rate at which a change in said signal is transmitted to said valve, said second means being comprised of variable restrictor means disposed within said second fluid conduit for limiting the flow rate of fluid through said second conduit.

8. The invention as set forth in claim 7 wherein said variable restrictor varies said rate of flow in response to engine inlet pressure.

* * * * *